US006646593B1

United States Patent
Garren (10) Patent No.: US 6,646,593 B1
(45) Date of Patent: Nov. 11, 2003

(54) PROCESS FOR MAPPING MULTIPLE-BOUNCE GHOSTING ARTIFACTS FROM RADAR IMAGING DATA

(75) Inventor: David Alan Garren, Fairfax, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 10/059,416

(22) Filed: Jan. 31, 2002

Related U.S. Application Data
(60) Provisional application No. 60/345,639, filed on Jan. 8, 2002.

(51) Int. Cl.[7] .......................... G01S 13/89; G01S 13/90
(52) U.S. Cl. ........................ 342/179; 342/25; 342/159; 342/176; 342/195
(58) Field of Search .......................... 342/25, 27, 28, 342/59, 159, 160, 161–164, 175, 179, 188–197, 176, 177, 178, 180–187

(56) References Cited

U.S. PATENT DOCUMENTS

| | | | | |
|---|---|---|---|---|
| 4,855,747 | A | * 8/1989 | Steinberg | 342/179 |
| 5,061,931 | A | 10/1991 | Farina et al. | 342/25 |
| 5,160,932 | A | * 11/1992 | Bull | 342/25 |
| 5,307,070 | A | * 4/1994 | Runge et al. | 342/25 |
| 5,805,098 | A | 9/1998 | McCorkle | 342/25 |
| 6,018,306 | A | 1/2000 | Serbin | 342/25 |
| 6,130,641 | A | * 10/2000 | Kraeutner et al. | 342/25 |
| 6,222,933 | B1 | 4/2001 | Mittermayer et al. | |

OTHER PUBLICATIONS

"The Spotlight Synthetic Aperture Radar Project" [online], Fact Sheet Library, Aerospace Radar, [retrieved on Jan. 10, 2002], 3 pp., Retrieved from Internet: http:www.dreo.dnd.ca/pages/factsheet/ar/ar0011_e.html.

"What is Synthetic Aperture Radar?", [online], Sandia National Laboratories, [retrieved on Jan. 10, 2002], 3 pp, Retrieved from Internet: www.sandia.gov/radar/whatis.html.

L. Gagnon, H. Oppenheim, P. Valin, R&D Activities in Airborne SAR Image Processing/Analysis at Lockheed Martin Canada, Proceedings SPIE #3491, Jul. 1998, p. 998–1003.

David C. Munson, Jr., James Dennis O'Brien, W. Kenneth Jenkins, A Tomographic Formulation of Spotlight–Mode Synthetic Aperture Radar, Proceedings of the IEEE, vol. 71, No. 8, Aug. 1983, p. 917–925.

Richard Gordon, A Tutorial on ART (Algebraic Reconstruction Techniques), IEEE Transactions on Nuclear Science, vol. NS–21, Jun. 1974, pp. 78–93.

P. R. Smith, T. M. Peters, R. H. T. Bates, Image Reconstruction from Finite Numbers of Projections, pp. 361–383.

R. H. T. Bates, T. M. Peters, Towards Improvements in Tomography, New Zealand Journal of Science 14: pp. 883–896, 1971.

Donald Ludwig, The Radon Transform on Euclidean Space, Communications on Pure and Applied Mathematics, vol. XIX, pp. 49–81, 1966.

* cited by examiner

*Primary Examiner*—Bernarr E. Gregory
(74) *Attorney, Agent, or Firm*—Kilpatrick Stockton LLP (57) ABSTRACT

Described herein are frequency-domain back-projection processes for forming spotlight synthetic aperture radar ("SAR") images that are not corrupted by the effects of multiple-bounce ghosting artifacts. These processes give an approximately exact reconstruction of the multiple bounce reflectivity function (MBRF) $f(x,y,\gamma)$. Specifically, the evaluation of $f(x,y,\gamma)$ in the $\gamma=0$ plane gives an approximately exact reconstruction of the true object scattering centers which is uncorrupted by multiple-bounce contributions to the phase history data $G(\xi,\theta)$. In addition, the non-zero dependence of $f(x,y,\gamma)$ upon the MB coordinate $\gamma$ can be used to facilitate the identification of features-interest within the imaged region.

12 Claims, 9 Drawing Sheets

PROCESS FOR MAPPING MULTIPLE-BOUNCE GHOSTING ARTIFACTS FROM RADAR IMAGING DATA

CROSS-REFERENCE TO RELATED APPLICATIONS

This application claims priority to and incorporates by reference in its entirety, U.S. Provisional Patent Application No. 60/345,639, entitled "SPOTLIGHT SAR IMAGE FORMATION WITHOUT MULTIPLE-BOUNCE GHOSTING ARTIFACTS" filed Jan. 8, 2002.

BACKGROUND OF THE INVENTION

1. Field of the Invention

Generally, the invention involves a process for forming radar images. More specifically, the invention involves a process for mapping multiple bounce ghosts (MBGs) and for forming radar images without the deleterious effects of MBGs.

2. Description of the Related Art

Radar, at its most basic application, is used to measure the range to a target. With knowledge of the speed of propagation of the wave, i.e., electromagnetic wave, that is transmitted toward the target, it is possible to resolve in a first dimension, the distance to the target, based on the received reflected wave or echo. In order to use radar as an imaging tool, it is necessary to collect information about the cross-range of the target, in addition to the first dimension information. This cross-range information is about a second dimension perpendicular to the first dimension.

Synthetic aperture radar (SAR) can be used to collect data in both the first and second dimensions, through a process wherein the reflected waves are measured at different angles with respect to an object-of-interest. This process is referred to in the art as collecting radar measurements over a synthetic (as opposed to a literal) aperture. By taking various measurements of the object-of-interest from varying aspect angles, it is possible to determine approximate distance to the scattering centers within an object-of-interest in the first dimension and location of these scattering centers within the object-of-interest in the second, cross-range dimension. This process of two-dimensional imaging is commonly referred to as reflection tomography.

SAR systems take advantage of the long-range propagation characteristics of radar signals and the complex information processing capability of modern digital electronics to provide high-resolution imagery. SAR imaging is not restricted by time of day or atmospheric conditions due to its operative frequencies. Consequently, SAR imaging supplements other photographic and optical imaging techniques in order to facilitate environmental monitoring, earth-resource mapping, and military operations which may require broad-area imaging at high resolutions. More specifically, SAR technology provides detailed terrain information to geologists for mineral exploration, environmentalists for determination of oil spill boundaries, navigators for sea state and ice hazard mapping, and the military for reconnaissance and targeting information.

Other systems using reflection data, also referred to as projection measurements, are fault inspection systems using acoustic imaging, submarine sonar for imaging underwater objects and the like, seismic imaging system for tunnel detection, oil exploration, geological surveys, etc., and medical diagnostic tools such as sonograms and echocardiograms.

There have been two basic types of processing techniques used in the field of reflection tomography to reconstruct single-bounce (SB) reflection data. First, the frequency-domain projection-slice theorem takes the measured phase history from the reflection data taken at different aspect angles and generates the reconstruction of an image using Fourier transforms. This reconstruction technique is often used for reconstructing SAR image data in order to minimize the computational load that results from necessarily complex processing. A second technique, more prevalent in the medical imaging community, is based on the time-domain back projection techniques. Both of these techniques are discussed in U.S. Pat. No. 5,805,098 to McCorkle which is incorporated herein by reference in its entirety.

SUMMARY OF THE INVENTION

Summary of the Problem

The reflection data processing techniques described in the related art assume that the impinging wave reflects a single time off of the object of interest before returning back to the receiver. This assumption neglects the situation wherein the wave actually reflects off of multiple portions of the object of interest, cascading for any number of times, before returning to the receiver. All prior art on reflection tomography assumes only one bounce. That is, conventional tomography does not include the effects of multiple-bounce (MB) scattering events wherein the mediating waveform first scatters off of one portion of the extended object-of-interest, which then scatters in a cascade fashion off of one or more other regions of this same extended object-of interest or off of other objects before scattering into the receiver. These facts motivate the need for the development of a modified image formation process that applies for cases in which the measured reflection data also identifies and accounts for MB scattering events.

A particular imaging scenario wherein the prior art process is insufficient includes determining the physical distribution of the scattering centers for cases in which multiple-bounce echoes occur. For example, prior art processes would have a difficult time determining from three (3) received echoes that instead of three scattering centers for an object-of-interest, the image actually contained two targets, wherein the third echo was between the two scattering centers as opposed to a third scattering center. The problem is exacerbated in a case where there are many scattering centers within the image, with the possibility for multiple bounces between the scattering centers. Further, in the case of SAR imaging, the process becomes even more complicated by the fact that the object (or region)-of-interest radar information is only gathered over a very small aspect angle range, for example, up to approximately 15 degrees. Current processing schemes place the multiple-bounce echoes at incorrect (ghost) locations due to fundamental assumptions implicit in the processing.

Summary of the Solution

Described herein are frequency-domain back-projection processes for forming, e.g spotlight SAR images that are not corrupted by the effects of multiple-bounce ghosting artifacts. These processes give an approximately exact reconstruction of the multiple bounce reflectivity function (MBRF) $f(x,y,\gamma)$. As shown in the embodiments herein, the reconstruction process is not affected to any greater extent by noise and interference than in the case of the single bounce processing. Specifically, the evaluation of $f(x,y,\gamma)$ in the γ=0 plane gives an approximately exact reconstruction of the true object scattering centers which is uncorrupted by multiple-bounce contributions to the phase history data G(ξ,θ). In addition, the non-zero dependence of $f(x,y,\gamma)$ upon the MB coordinate γ can be used to facilitate the identification of features-interest within the imaged region.

In an embodiment of the present invention, a process is described for incorporating the effects of multiple bounces obtained using the back projection imaging process referred to herein, in order to obtain a cleaned up image that has removed the misleading effects of the multiple bounces, commonly referred to as multiple bounce ghosts (MBGs). The process identifies the MBGs and maps the MBG reflections into a metrically-correct image plane, also referred to as, a delay image plane or higher dimensional image plane, creating auxiliary images, which are useful in providing further information about the viewing region, including additional discriminating information that could assist in object recognition and identification. The imaging information, including both single and multiple bounce information, is only required for a narrow range of measurement angles.

The processes of the present invention are useful in three dimensional imaging, providing images that are free of multi-path effects, and extending the field-of-use of the technology beyond SAR imaging to all areas of reflection tomography. Because the technology incorporates a physical model that explicitly allows for multi-bounce effects in image formation, it is applicable to any image formation technology where that phenomenon is found such as, but not limited to, real aperture radar imaging, synthetic aperture radar (SAR) imaging, inverse SAR (ISAR) imaging, active sonar underwater acoustic mapping, active geographic acoustic exploration and ultrasonic medical imaging.

DETAILED DESCRIPTION OF THE PREFERRED EMBODIMENTS OF THE PRESENT INVENTION

Figure 1A:
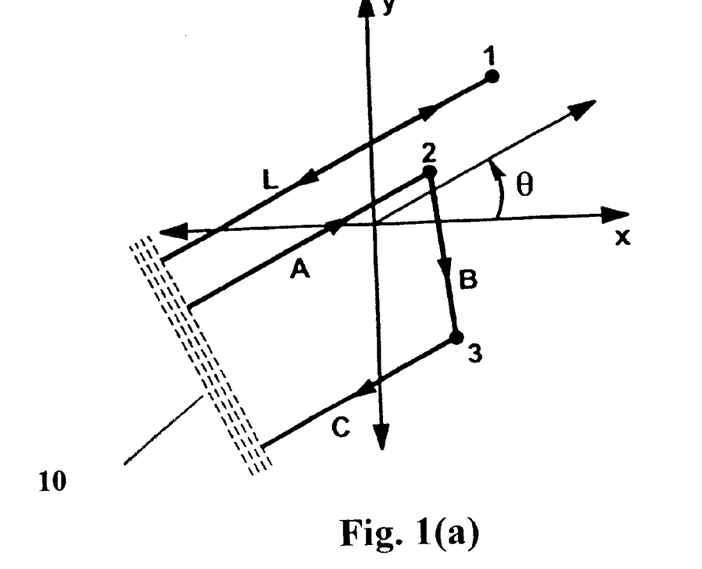
FIGS. 1(a)–1(b) illustrate scattering events according to embodiments of the present invention.

In a preferred embodiment of the present invention, the imaging process assumes the condition that a scattered waveform has the same characteristics as the incident waveform. In the context of SAR imaging, the measured range to target (i.e., assumed object-of-interest) of a given multiple bounce (MB) scattering event at some aperture angle is identical to that of an equivalent single bounce (SB) scattering event. FIG. 1a presents an example of such equivalent scattering events. In this example, the transmitter is co-located with the receiver (both shown as 10) at a large distance from the region-of-interest, so that the effects of a curved wave front can be neglected. One skilled in the art recognizes that the process described herein may be adjusted for non co-located transmitter and receiver configurations, as well as for distances from the region of interest which result in curved wavefronts. FIG. 1a shows that waveform traverses a total distance of 2L in propagating from the transmitter at 10 to scattering point (SP) 1 and back to the co-located receiver at 10. This distance represents the measured range-to target from the co-located transmitter-receiver to SP 1 based upon waveform transmission and the corresponding reception of the its echo.

The specifics of the transmitter and receiver configurations usable with the embodiments described herein are known to those skilled in the art. Further, one skilled in the art recognizes that the mode of collection of the SAR data is not limited to any single mode, but may include, among others, spotlight mode, strip map mode, range Doppler profiler (RDP) mode, air-to-air mode, and the like.

Still referring to FIG. 1a, the multiple scattering event due to SPs 2 and 3 are considered. Here, the transmitted waveform reflects off of SP 2, which then reflects off of SP 3 prior to reception. If the sum of the line segments A+B+C is equal to 2L in FIG. 1a, then the measured range-to target of the single-scattering event at SP 1 at the shown measurement angle θ is identical to, and therefore indistinguishable from, the double-scattering event due to the cascaded reflection from SP 2 to SP 3. In addition, multiple-scattering events involving three or more scattering points can have this same range-to-target, as shown in FIG. 1b.

Figure 1B:
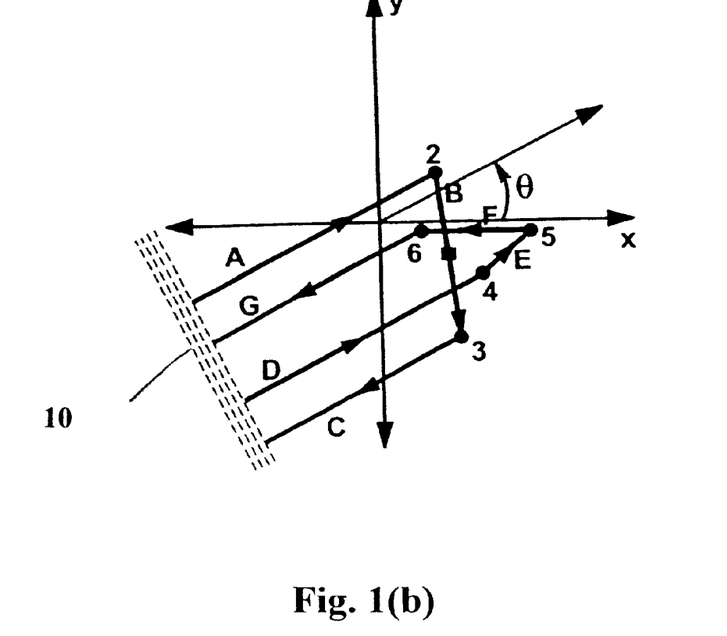

Referring to FIG. 1b, the sum of the two-point scattering event, A+B+C, cascaded from SP 2 and SP 3 and measured at the receiver 10, is equivalent to the sum of the three-point scattering event, D+E+F+G, cascaded from SP 4, SP 5, and SP 6 measured at the receiver 10, at the shown measurement angle θ.

As described in the Summary of the Problem, conventional SAR theory assumes that all scattering events which affect the measured phase history data (i.e., range-to-target projections) are due to SB effects, as occurs with SP 1 in FIG. 1a. This is not always the case. When MB events, such as SPs 2 and 3 in FIG. 1a, also significantly impact the measured phase history data, the application of the conventional SAR image formation techniques yield imperfect reconstructions of the region-of-interest.

According to an embodiment of the present invention, the best image of the true scattering centers is obtained by taking into account the MBG data retrieved via imaging through application of an image reconstruction algorithm for multi-bounce scattering (IRAMS). This process for applying the IRAMS is developed through examination of the properties of the MB scattering event shown in, for example, FIG. 1a. The data, retrieved via the transmitter and receiver configurations 10, is processed according to the IRAMS via a processor (not shown). Processors are well known in the art and will not be discussed further herein. Let $(x_i, y_i)$ denote the two-dimensional (2-D) Cartesian coordinates of the spatial position of SP 2 with which the incident waveform initially interacts. Define $(x_f, y_f)$ to be the spatial position of SP 3 with which the waveform that was initially reflected off of SP 2 interacts before being reflected into the receiver. Let the variable $\gamma$ denotes the effective path length that the waveform traverses between the initial $(x_i, y_i)$ and final $(x_f, y_f)$ scattering centers. This path length $\gamma$ is not required to be equal to the distance between the initial and final scattering centers, i.e., $\sqrt{(x_f-x_i)^2+(y_f-y_i)^2}$, as occurs for scattering events involving only two scattering centers. For example, triple-point scattering events are possible, as shown in FIG. 1b. FIG. 1b shows a waveform scattering off of the initial point $(x_i, y_i)$ of SP 4 to an intermediate location $(x_5, y_5)$ at SP 5, before reflecting off of the final scattering center $(x_f, y_f)$ at SP 6 and subsequently being collected into the receiver.

Under the definitions above, all single-reflection scattering events are characterized by $\gamma=0$. Double-reflection scattering events have $\gamma=\sqrt{(x_f-x_i)^2+(y_f-y_i)^2}$, whereas N-point scattering events with N>2 are characterized by $\gamma > \sqrt{(x_f-x_i)^2+(y_f-y_i)^2}$. Again, the goal of this analysis is to remove the effects of all MB scattering events, which are described by $\gamma>0$, in order to form an improved spotlight SAR image.

FIGS. 1a and 1b reveal that the measured range-to target of a scattering event relative to that of the coordinate origin (x=0, y=0) depends upon the observation angle $\theta$ via $$s(\theta)=[\{x_i+x_f\}\cos(\theta)+\{y_i+y_f\}\sin(\theta)+\gamma]/2. \quad (1)$$

The division by 2 arises since the range-to-target is equal to one-half of the round-trip distance that the waveform traverses from the transmitter to the object and back into the co-located receiver. The range-to-target spatial coordinate s is related to the waveform time-of-flight t via $$t = \frac{2s}{c}, \quad (2)$$

with c equal to the waveform speed. Given the MB range-to-target measurements $s(\theta)$ collected over some extent of angles $\theta$ for an isolated scattering event, it is clear from Eq.(1) that it is possible to determine only the mean position of the initial and final scattering centers, i.e., $\{(x_i+x_f)/2, (y_i+y_f)/2\}$, and the total path length $\gamma$ between these two points. No other information can be unambiguously gleaned.

Since only the mean position of the initial and final scattering centers can be determined uniquely, the measured range-to-target for a N-point scattering event with respect to the selected coordinate origin can be expressed in the form $$s(\theta)=x\cos(\theta)+y\sin(\theta)+\gamma, \quad (3)$$

in terms of the parameters $\{x=(x_i+x_f)/2, y=\{y_i+y_f\}/2\}$, $\gamma \equiv \tilde{\gamma}/2\}$ of Eq. (1). Every N-point scattering event is characterized by the parameters $(x,y,\gamma)$ and traces a sinusoid in range-angle $(s,\theta)$ that is shifted in the s-direction by a distance of $\gamma$. In contrast, each SB scattering event is characterized by the parameters $(x,y; \gamma=0)$ and traces an unshifted sinusoid in range-angle space.

Equation (3) shows that for any generic N-point scattering event with N>1, range-to-target measurements can yield only the values $(x,y,\gamma)$. This result applies even if there are no other scattering events present. In fact, many individual scattering events having one, two, or more bounces can have identical values of $(x,y,\gamma)$. Specifically, all scattering events having the same average position for the initial and final scattering centers, i.e., $x\equiv(x_i+x_f)/2$ and $y\equiv\{y_i+y_f\}/2$, and having the same total path length $\gamma\equiv 2\gamma$ between the initial and final scattering centers contribute to the same $(x,y,\gamma)$-point in the MB reflectivity function (MBRF) density $f(x, y,\gamma)$. That is, the density $f(x,y,\gamma)$ at a given point in $(x,y,\gamma)$-space is formed by the integral of all N-point scattering events characterized by the same values of x, y, and $\gamma$. In general, the MBRF $f(x,y,\gamma)$ is permitted to be a complex function, as in the modeling of the single-bounce reflectivity function $f_{SB}(x,y)$.

Consider the two different scattering events presented in FIG. 1b. The range-to-target of the transmitted waveform is considered with respect to the parallel wave front denoted by the thin dashed lines in this figure. The line segments have been drawn so that the following relations hold:

$$A+B+C=D+E+F+G, \quad (4)$$

$$x_2+x_3=x_4+x_6 \quad (5)$$

$$y_2+y_3=y_4+y_6 \quad (6)$$

Thus, the 2-point scattering event of SPs 2 and 3, and the 3-point scattering event of SPs 4, 5, and 6 have the same values of x, y, and $\gamma$ within the MBRF $f(x,y,\gamma)$. The MBRF is the most basic representation of the region-of-interest which can be reconstructed based upon phase history E measurements that include contributions due to MB scattering events.

The measured MB projection function $g(s,\theta)$ is determined by the MBRF $f(x,y,\gamma)$ via $$g(s,\theta)=\int_{-\infty}^{\infty}dx\int_{-\infty}^{\infty}dy\int_{-\infty}^{2\theta}d\gamma f(x,y,\gamma)\delta(x\cos(\theta)+y\sin(\theta)+\gamma-s), \quad (7)$$

with $\delta(\ldots)$ the standard Delta function defined by $A(s)\equiv\int ds' A(s')\delta(s'-s)$. That is, Eq. (7) is merely the integral of all range-to-target projections of MB scattering events, as determined by Eq. (3). The integral over $d\gamma$ in Eq. (7) applies from $-\infty$ to $\infty$, provided that the MBRF $f(x,y,\gamma)$ is constrained to be equal to zero for $\gamma<0$. If the MBRF density contains only single-bounce effects, i.e., $f_{SB}\equiv(x,y)f(x,y; \gamma=0)$, then the MB transformation equation (7) reduces to the conventional Radon transform $$g_{SB}(s,\theta)=\int_{-\infty}^{\infty}dx\int_{-\infty}^{\infty}dy f_{SB}(x,y)\delta(x\cos(\theta)+y\sin(\theta)-s) \quad (8)$$

Define the 1-D Fourier transform of the function $g(s,\theta)$ with respect to s, applied independently for each observation angle $\theta$, i.e., $$G(\xi,\theta)=\int_{-\infty}^{\infty}ds\exp(-j2\pi s\xi)g(s,\theta). \quad (9)$$

The notation $g(s,\theta)\Leftrightarrow G(\xi,\theta)$ expresses this relationship. The measurements for $G(\xi,\theta)$ in Eq. (9) are collected over some finite interval with respect to the spatial frequency variable, i.e., $\xi_{min}\leq\xi\leq\xi_{max}$, and some finite interval in the observation angle, i.e. $\theta_{min}\leq\theta\leq\theta_{max}$. The spatial frequency coordinate, is related to the waveform temporal frequency coordinate $\tau$ via $$\tau=c/2\xi, \quad (10)$$

so that the waveform temporal bandwidth is $$\Delta\tau=c/2\{\xi_{max}-\xi_{min}\}. \quad (11)$$

Inserting Eq. (7) into Eq. (9) and interchanging the order of integration gives $$G(\xi,\theta)=\int_{-\infty}^{\infty}dx\int_{-\infty}^{\infty}dy\int_{-\infty}^{\infty}d\gamma f(x,y,\gamma)\int_{-\infty}^{\infty}ds\exp(-j2\pi s\xi)\delta(x\cos(\theta)+y\sin(\theta)+\gamma-s). \quad (12)$$

Evaluation of the delta function yields the forward MB transformation between the MBRF $f(x,y,\gamma)$ and the phase history measurements $G(\xi,\theta)$:

$$G(\xi,\theta) = \int_{-\infty}^{\infty} dx \int_{-\infty}^{\infty} dy \int_{-\infty}^{\infty} d\gamma f(x,y,\gamma) \exp(-j2\pi[x\cos(\theta)+y\sin(\theta)+\gamma]\xi). \quad (13)$$

This equation implicitly assumes that the MBRF $f(x,y,\gamma)$ is invariant over the extent of measurement angles a and spatial frequencies 4 under consideration. In a similar fashion, the omission of MB effects yields the corresponding SB result:

$$G_{SB}(\xi,\theta) = \int_{-\infty}^{\infty} dx \int_{-\infty}^{\infty} dy f_{SB}(x,y) \exp(-j2\pi[x\cos(\theta)+y\sin(\theta)]\xi) \quad (14)$$

with $G_{SB}(\xi,\theta) \leftrightarrow g_{SB}(s,\theta)$.

There are two different classes of techniques for inverting Eq. (14) in order to obtain the SB reflectivity function density $f_{SB}(x,y)$ given the measured projections $G_{SB}(\xi,\theta)$. The first class of methods invokes the projection-slice theorem. However, it is not clear that these projection-slice techniques can be utilized to invert the particular MB transformation equation (13) of the present embodiment. In particular, the measurements $G(\xi,\theta)$ are collected by varying the values of only two variables, i.e., $\xi$ and $\theta$. In contrast, the three-dimensional (3-D) Fourier transform of the desired MBRF density $f(x,y,\gamma)$ requires an appropriate set of projection measurements over three dimensions, whereas there exist only two in the current example. Therefore, the application of projection-slice methods is not applied to invert the MB transformation equation (13) in the present embodiment. One skilled in the art recognizes that the application of the projection-slice method may be used as an alternative to inversion in an alternative embodiment, wherein the data consists of three-dimensional projection measurements.

The second class of inversion methods used to reconstruct the SB reflectivity function $f_{SB}(x,y)$ utilizes back-projection functions. Back projection functions reconstruct $f_{SB}(x,y)$ based upon the measured function-domain projection function $g_{SB}(s,\theta)$. Alternatively, a frequency-domain back-projection technique may be used to reconstruct $f_{SB}(x,y)$. The present embodiment applies back-projection techniques in order to reconstruct the MBRF $f(x,y,\gamma)$ based upon the phase history measurements $G(\xi,\theta)$.

Alternatively, for a continuous-domain solution, the inversion of the MB projection equation begins with the following definition of the back-projection operation applied to the MB measured transform-domain projections $G(\xi,\theta)$:

$$b(x,y,\gamma) = \int_{\theta_{min}}^{\theta_{max}} d\theta \int_{\xi_{min}}^{\xi_{max}} d\xi G(\xi,\theta) \exp(j2\pi[x\cos(\theta)+y\sin(\theta)+\gamma]\xi). \quad (15)$$

The limits of integration in Eq. (15) is chosen to be consistent with the collected transform-domain measurements, i.e., $\xi_{min} \leq \xi \leq \xi_{max}$ and $\theta_{min} \leq \theta \leq \theta_{max}$, as described above.

Substituting Eq. (13) for $G(\xi,\theta)$ into the back projection function $b(x,y,\gamma)$ of Eq. (15) and interchanging the order of integration gives $$b(x,y,\gamma) = \int_{-\infty}^{\infty} dx' \int_{-\infty}^{\infty} dy' \int_{-\infty}^{\infty} d\gamma' f(x',y',\gamma') \int_{\theta_{min}}^{\theta_{max}} d\theta \int_{\xi_{min}}^{\xi_{max}} d\xi \lambda(x-x', y-y', \gamma-\gamma'). \quad (16)$$

in terms of the kernel function $\lambda(x,y,\gamma)$ is defined by $$\lambda(x, y, \gamma) \equiv \int_{\theta_{min}}^{\theta_{max}} d\theta \int_{\xi_{min}}^{\xi_{max}} d\xi \exp(j2\pi[x\cos(\theta)+y\sin(\theta)+\gamma]\xi). \quad (17)$$

Thus, the MB back-projection function $b(x,y,\gamma)$ can be expressed in terms of the MBRF $f(x,y,\gamma)$ via $$b(x,y,\gamma) = \lambda(x,y,\gamma) * f(x,y,\gamma). \quad (18)$$

In this equation, the symbol * denotes the 3-D convolution operation. The 3-D Fourier transform operator $F_3$ applied to both sides of Eq. (18) gives the following inversion technique for obtaining the MBRF $f(x,y,\gamma)$, given the transform-domain measurements $G(\xi,\theta)$:

$$f(x, y, \gamma) = \mathcal{F}_3^{-1}\left\{\frac{\mathcal{F}_3\{b(x, y, \gamma)\}}{\mathcal{F}_3\{\lambda(x, y, \gamma)\}}\right\}. \quad (19)$$

Here, the operator $F_3^{-1}$ denotes the inverse Fourier transform in three dimensions. In Eq. (19), the back-projection function $b(x,y,\gamma)$ is computed by inserting the transform-domain measurement function $G(\xi,\theta)$ into Eq. (15). A solution for $f(x,y,\gamma)$ exists provided that the 3-D Fourier transform of the kernel $\lambda(x,y,\gamma)$ has no zeros in the region-of-interest. This constraint involved in obtaining the MBRF solution is more transparent in the discrete-domain, as shown in the following subsection.

SAR image reconstruction requires that the MBRF $f(x,y,\gamma)$ be determined on a discrete grid in $(x,y,\gamma)$ space, i.e., $\{x_l\}_{l=1,\ldots,L}$, $\{y_m\}_{m=1,\ldots,M}$, and $\{y_n\}_{n=1,\ldots,N}$. This grid is not required to have equal intervals between grid points in each of the three dimensions of $(x,y,\gamma)$-space. However, the assumption of a uniform grid will be shown to reduce the required computation time, even if each of the three dimensions has a different resolution. This analysis generates an estimate of the MBRF matrix f(l,m,n), which is the discrete approximation of the MBRF density $f(x,y,\gamma)$.

The measurements arising from the coherent processing of the received radar waveform are transduced at a finite set of discrete spatial frequencies $\{\xi_p\}_{p=1,\ldots,P}$ and a finite set of discrete observation angles $\{\theta_q\}_{q=1,\ldots,Q}$ relative to the defined coordinate system. This grid in $(\xi_p, \theta_q)$-space is not required to be uniform, just as the $(x_l,y_m,\gamma_n)$-space of the MBRF matrix f(l,m,n) can be non-uniform. Thus, the measured phase history data are determined by the discrete domain measurement vector G(p,q) as an approximation of the density $G(\xi,\theta)$.

Given the definitions for the vectors f(l,m,n) and G(p,q), the MB transformation equation (13) has the discrete form $$G(p, q) = \sum_{l=1}^{L} \sum_{m=1}^{M} \sum_{n=1}^{N} H(l, m, n, p, q) f(l, m, n), \quad (20)$$

in terms of the matrix of phase functions $$H(l,m,n,p,q) = \exp(-j2\pi[x_l \cos(\theta_q) + y_m \sin(\theta_q) + \gamma_n] \xi_p). \quad (21)$$

Equation (20) can be expressed in the basic form of the algebraic reconstruction problem $$G = HF, \quad (22)$$

where F is the vector of unknowns of length $U \equiv L \times M \times N$, the variable G is a vector of measurements of length $V \equiv P \times Q$ and if is the $U \times V$ matrix of the vectors giving the projection of an (l,m,n) object space point onto (p,q) measurement space. The requirement that $V \geq U$ must be satisfied in order to obtain a solution for F, otherwise, Eq. (22) is undetermined.

A method for obtaining a solution of Eq. (22) is via the pseudo-inverse $$F = \{H^H H\}^{-1} H^H G, \quad (23)$$

with the superscript H denoting the Hermitian transpose. The pseudo-inverse gives the unique least-squares solution provided that the square matrix $H^H H$ is non-singular. For cases in which the matrix $H^H H$ is ill-conditioned, either diagonal loading or singular-value decomposition can be applied. In addition, related techniques, known to those skilled in the art, can be applied for cases of additive noise.

The matrix $H^H H$ is of size $U \times U$, so that the computation of the matrix inverse in Eq. (23) is of order $O(U^3)$, which is the rate-determining step. However, techniques of order $O(U \times V)$ can be applied if the desired MBRF vector f(l,m,n) is computed on a uniform grid in $(x_l, y_m, \gamma_n)$-space. To develop these techniques, the back-projection vector is defined via $$b(l, m, n) \equiv \sum_{p=1}^{P} \sum_{q=1}^{Q} H^H(l, m, n, p, q) G(p, q). \quad (24)$$

Inserting Eq. (20) for G(p,q) into Eq. (24) and interchanging the order of the summation gives $$b(l, m, n) = \sum_{l=1}^{L} \sum_{m=1}^{M} \sum_{n=1}^{N} \overline{\Lambda}(l, l', m, m', n, n') f(l', m', n'), \quad (25)$$

in terms of the matrix kernel $$\overline{\Lambda}(l, l', m, m', n, n') \equiv \sum_{p=1}^{P} \sum_{q=1}^{Q} H^H(l, m, n, p, q) H(l, m, n, p, q) =$$

$$\sum_{p=1}^{P} \sum_{q=1}^{Q} \exp(j2\pi \overline{\Omega}(l, l', m, m', n, n')), \quad (26)$$

with $$\overline{\Omega}(l,l',m,m',n,n') = [\{x_l - x_{l'}\} \cos(\theta_q) + \{y_m - y_{m'}\} \sin(\theta_q) + \{\gamma_n - \gamma_{n'}\}] \xi_p. \quad (27)$$

For the case of a uniform grid in $(x_l, y_m, \gamma_n)$-space, i.e., $\{x_l = l\delta_x\}_{l=1,\ldots,L}$, $\{y_m = m\delta_y\}_{m=1,\ldots,M}$, and $\{\gamma_n = n\delta_\gamma\}_{n=1,\ldots,N}$, with $\delta_x, \delta_y, \delta_\gamma$, all constants, Eq. (27) reduces to $$\overline{\Omega}(l,l',m,m',n,n') = [\{l-l'\}\delta_x \cos(\theta_q) + \{m-m'\}\delta_y \sin(\theta_q) + \{n-n'\}\delta_\gamma] \xi_p. \quad (28)$$

Thus, Eq. (25) has the form $$b(l,m,n) = \Lambda(l,m,n) * f(l,m,n), \quad (29)$$

with $$\Lambda(l, m, n) \equiv \sum_{p=1}^{P} \sum_{q=1}^{Q} \exp(j2\pi \Omega(l, m, n, p, q)), \quad (30)$$

and the phase matrix $$\Omega(l,m,n,p,q) = [l\delta_x \cos(\theta_q) + m\delta_y \sin(\theta_q) + n\delta_\gamma] \xi_p. \quad (31)$$

Here, the symbol "*" denotes the 3-D discrete convolution. The convolutional structure of Eq. (29) permits the inversion of f(l,m,n) to be computed in FFT-time of order $O(U \log_2(U))$. Thus the rate-determining step is the computation of the back-projection vector b(l,m,n) given the measurement phase history vector G(p,q) via Eq. (24), which is of order $O(U \times V)$. Alternatively, function-domain back-projection operations can be performed in order $O(U \log_2(U))$, such that in an alternative embodiment of the present invention, the transform-domain back-projections applied to MB image reconstruction described herein, can also can be implemented in order $O(U \log_2(U))$.

The SB analog of Eq. (29) has the form $$b_{SB}(l,m) = \Lambda_{SB}(l,m) * f_{SB}(l,m), \quad (32)$$

with $$\Lambda_{SB}(l, m) \equiv \sum_{p=1}^{P} \sum_{q=1}^{Q} \exp(j2\pi \Omega_{SB}(l, m, p, q)). \quad (33)$$

and $$\Omega_{SB}(l,m,n,p,q) = [l\delta_x \cos(\theta_q) + m\delta_y \sin(\theta_q)] \xi_p. \quad (34)$$

Here, the symbol "*" denotes two-dimensional (2-D) discrete convolution. In Eq. (32), $b_{SB}(l,m)$ is determined by $$b_{SB}(l, m) = \sum_{p=1}^{P} \sum_{q=1}^{Q} H_{SB}^H(l, m, n, p, q) G(p, q), \quad (35)$$

in terms of the matrix of SB phase functions $$H_{SB}(l,m,p,q) = \exp(-j2\pi \Omega_{SB}(l,m,p,q)). \quad (36)$$

Since the measurements G(p,q) are determined by the MB transformation Eq. (20), the SB reconstruction technique of computing f(l,m) based upon Eqs. (32)–(36) will contain undesirable artifacts unless contributions due to MB scattering events are absent in the measurement phase history data G(p,q).

The previous paragraphs have developed a technique for MB image reconstruction by deriving the 3-D convolution equation (29), which is equivalent to the matrix form of Eq. (25). The existence of a well-behaved solution for the MBRF $\bar{f}(l,m,n)$ requires that the 3-D Hermitian-Toeplitz matrix $\bar{\Lambda}(l,l',m,m',n,n')=\Lambda(l-l',m-m',n-n')$ be non-singular. The constraint is satisfied if the vectors $h_{l,m,n}$, $(p,q)\equiv\Omega(l,m,n,p,q)$ are all linearly independent functions of the phase history measurement indices p and q. This constraint is satisfied if one or more of the elements of the normalized phase vectors $a_{l,m,n}(p,q)\equiv\Omega(l,m,n,p,q)$ of Eq. (31) change by unity or greater between adjacent cells in image-space (l,m,n). The normalized phase vectors $a_{l,m,n}(p,q)$ satisfy this requirement, and thus yield a well-behaved solution to Eq. (29) or (25), if the following conditions apply.

First, consider the fact that spotlight SAR phase history data is typically collected over a narrow extent of measurement angles $\Delta_\theta=\theta_{max}-\theta_{min}<<1$, here considered about $\theta=0$ without loss in generality. For a power-series expansion about $\theta=0$ through only first order in $\theta$, the factor $\cos(\theta_q)$ in the normalized phase of Eq. (31) is approximately unity. Thus, the dependence of the along-range coordinate x in Eq. (31) is identical to that of the MB coordinate $\gamma$, so that the effects of x and $\gamma$ cannot be differentiated through first order. Therefore, a well-behaved MB reconstruction requires that the extent of measurement angles $\Delta_\theta$ be sufficiently large that second order effects become significant. The required second order expansion of Eq. (31) has the form:

$$a_{l,m,n}(p,q)\equiv\Omega(l,m,n,p,q)\equiv[\{l\delta_x+n\delta_\gamma\}m\delta_y\theta_q-\tfrac{1}{2}l\delta_x\theta_q^2]\xi_p \quad (37)$$

In order to give a desired image-space resolution $(\delta_x,\delta_y,\delta_\gamma)$, the extent of measurements in spatial frequency $\Delta_\xi$ and in angle $\Delta_\theta$ must be selected to be large enough so that the zeroth, first, and second order terms in Eq. (37) all change by unity or greater between adjacent image-space cells (l,m,n). The change in the zeroth order phase term $\{l\delta_x+n\delta_y\}\xi_p$ of Eq. (37) exceeds unity between adjacent cells in both the x and $\gamma$ dimensions over the extent of spatial frequencies if $$\Delta_\xi\geq\max\{\delta_x^{-1},\delta_\gamma^{-1}\}, \quad (38)$$

which reduces to the well-known SB relation $\Delta_\epsilon\sim\delta_x^{-1}$.

The change in the first order phase term $m\delta_y\theta_q\xi_p$ of Eq. (37) exceeds unity between adjacent cells in the y dimension over the extent of measurement angles if $$\Delta_\theta\geq\{\xi_{cf}\delta_y\}^{-1}, \quad (39)$$

with $\xi_{cf}$ equal to the center spatial frequency. This relation is identical to that of the SB case.

The change in the second order phase term —$(\tfrac{1}{2})l\delta_x\theta_q^2\xi_p$ of Eq. (37) exceeds unity between adjacent cells in the x dimension over the extent of measurement angles if $$\Delta_\theta\geq\sqrt{2\{\xi_{cf}\delta_x\}^{-1}}, \quad (40)$$

Thus, the first and second order constraints of Eqs. (39) and (40) are combined to yield $$\Delta_\theta\geq\max\{\{\xi_{cf}\delta_y\}^{-1},\sqrt{2\{\xi_{cf}\delta_x\}^{-1}}\}. \quad (41)$$

For the case of identical image-space resolutions in each dimension, i.e., $\delta\equiv\delta_x=\delta_y=\delta_\gamma$, the required measurement extents reduce to $$\Delta_\xi\geq\delta^{-1}, \quad (42)$$

$$\Delta_\theta\geq\sqrt{2\{\xi_{cf}\delta\}^{-1}}. \quad (43)$$

Therefore, the extent of measurement frequencies required for the MB case is unmodified from that of the SB case. However, the extent of measurement angles is greater for the MB case than for the SB case.

In order to derive an expression for the measurement intervals $\delta_\xi$ and $\delta_\theta$ required for a desired image-space extent $(\Delta_x\equiv L\delta_x,\Delta_y\equiv M\delta_y,\Delta_\gamma\equiv N\delta_\gamma)$, consider the normalized phase of Eq. (37) with $\theta_q=q\delta_\theta$ and $\xi_p=\xi_{cf}+p\delta_\xi$, i.e., $$\Omega(l,m,n,p,q)\equiv\{l\delta_x+n\delta_\gamma\}\{\xi_{cf}+p\delta_\xi\}+m\delta_yq\delta_\theta\{\xi_{cf}+p\delta_\xi\}-\tfrac{1}{2}l\delta_xq^2\delta_\theta^2\{\xi_{cf}+p\delta_\xi\}. \quad (44)$$

The change in the normalized phase of Eq. (44) must be unity or less between adjacent measurement samples $\delta_\xi$ and $\delta_\theta$ in order to obtain a well-behaved solution. The change in the zeroth order term of Eq. (44) is unity or smaller over the image-space extents in the x and $\gamma$ dimensions if $$\delta_\xi\leq\{\Delta_x+\Delta_\gamma\}^{-1}. \quad (45)$$

The first order term of Eq. (44) is unity or smaller over the image-space extents in the y dimension if $$\delta_\theta\leq\{\xi_{cf}\Delta_y\}^{-1}, \quad (46)$$

whereas the second order term does so for $$\delta_\theta\leq\sqrt{2\{\xi_{cf}\Delta_x\}^{-1}}. \quad (47)$$

The combination Eqs. (46) and (47) gives $$\delta_\theta\leq\min\{\{\xi_{cf}\Delta_y\}^{-1},\sqrt{2\{\xi_{cf}\Delta_x\}^{-1}}\}, \quad (48)$$

For equal extents in the x and y spatial dimensions, i.e., $\Delta\equiv\Delta_x=\Delta_y$, Eq. (48) reduces to $$\delta_\theta\leq\{\xi_{cf}\Delta\}^{-1}, \quad (49)$$

which is identical to that of the SB case.

Figure 2A:
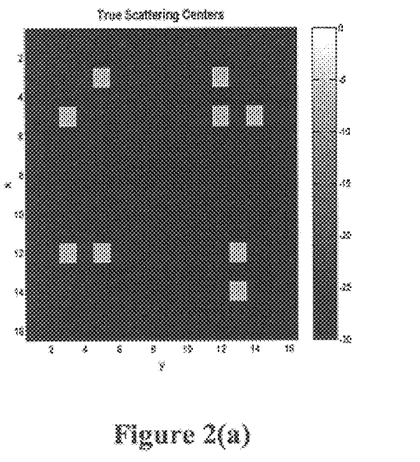
FIGS. 2(a)–2(d) illustrate true scattering point data from multiple depth planes, according to a first embodiment of the present invention.

The SAR image reconstruction processes developed above are applied to simulated MB phase history data with the following results. FIG. 2a presents an example containing a number of assumed scattering center reflectivities. The co-located transmitter and receiver (not shown) are located at the top of each of the figures, transmitting and receiving down and up the paper in a lengthwise direction. This plot corresponds to the $\gamma=0$ plane of the MBRF $f(x,y,\gamma)$. In addition, it is assumed that there exists a MB coupling within the four sets of closely-spaced scattering centers located in the four corners 12, 14, 16, and 18 of FIG. 2a. For example, there is a contribution to the MBRF $f(x,y,\gamma)$ corresponding to the two scattering centers at (x,y)=(12, 3) and (12, 5) located in corner 12 of the truth plot in FIG. 2a. Specifically, the $\gamma=1$ plane of the MBRF shown in FIG. 2b contains a contribution at the mean position (x,y)=(12, 4) between these two scattering centers, in accord with the distance $2\gamma=2$ between these two scattering centers. Likewise, the truth scattering centers at (x,y)=(12, 13) and (14, 13) in the lower right corner 14 of FIG. 2a yield the $\gamma=1$ MB contribution at (13, 13) in FIG. 2b. Similarly, the truth scattering centers at (x,y)=(3, 5) and (5, 3) in the upper left corner 16 of FIG. 2a have a MB coupling length of $2\gamma=2\sqrt{2}$, thus giving linearly-interpolated contributions at (4, 4) in the $\gamma=1$ and $\gamma=2$ planes of FIG. 2b and 2c.

Figure 2B:
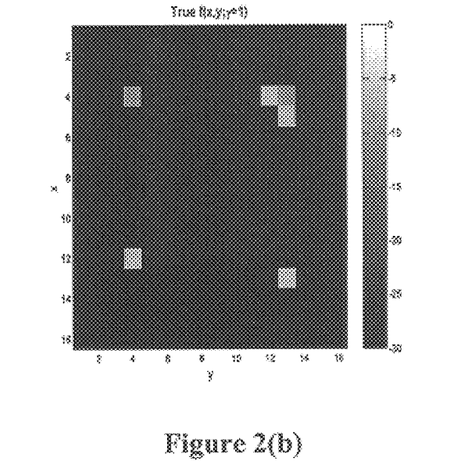
Figure 2C:
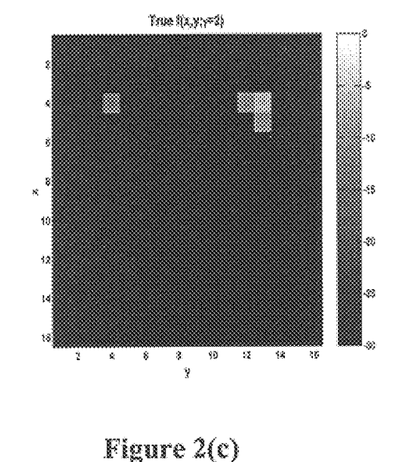

The three coupled scattering centers at (x,y)=(3, 12), (5, 12) and (5, 14) in the upper right corner 18 of FIG. 2a give three different double-bounce contributions corresponding to (x,y,$\gamma$)=(4, 12, 1), (5, 13, 1), and (4, 13, $\sqrt{2}$), similar to the double-bounce couplings in the other three corners 12, 14, and 16 of FIG. 2a. In addition, the upper right corner 18 scattering centers yield various triple-bounce events. For example, the scattering sequence (5, 14)→(5, 12)→(3, 12)

gives the MB contribution at $(x,y,\gamma)=(4, 13, 2)$ in FIG. 2c, since the total path length between the initial point (5, 14) and the final point (3, 12) is $2\gamma=4$. Likewise, the scattering sequence $(5, 14) \to (3, 12) \to (5, 12)$ gives a contribution for $(x,y,\gamma)=(5, 13, \sqrt{2}+1)$, and the sequence $(3, 12) \to (5, 14) \to (5, 12)$ yields $(x,y,\gamma)=(4, 12, \sqrt{2}+1)$.

Figure 2D:
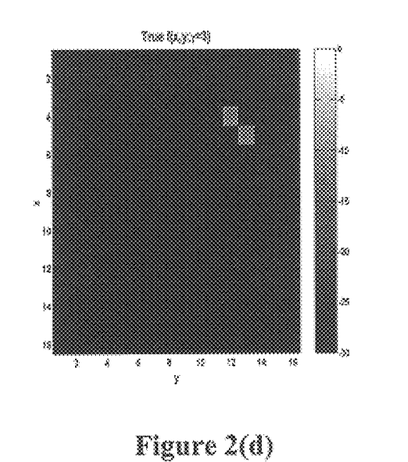

The MBRF $f(x,y,\gamma)$ for $\gamma \neq 0$ in FIGS. 2b–2d is based upon the true path lengths between the scattering centers of FIG. 2a. However, the coupling strengths between the scattering centers were selected in an ad hoc manner to be equal to that of the truth scattering centers themselves. Nevertheless, the MB techniques described herein apply generically for any specific quantitative rules governing the MB coupling strengths.

Figure 3A:
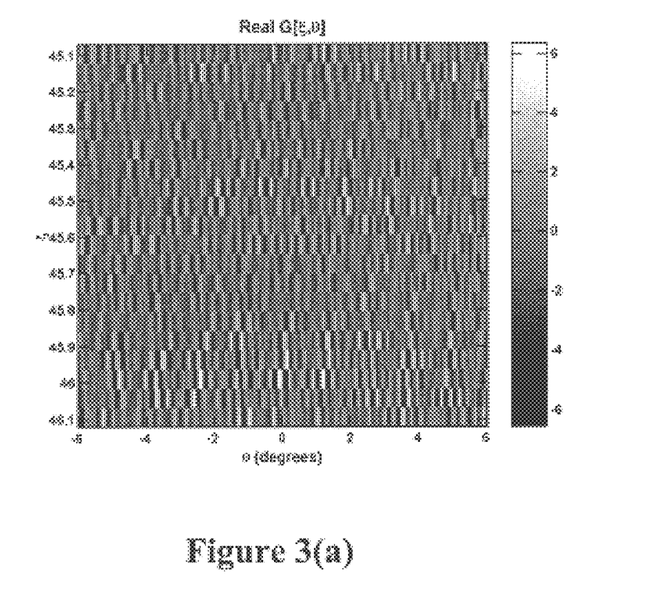
FIGS. 3(a)–3(b) illustrate measurement functions for scattering data according to a first embodiment of the present invention.
Figure 3B:
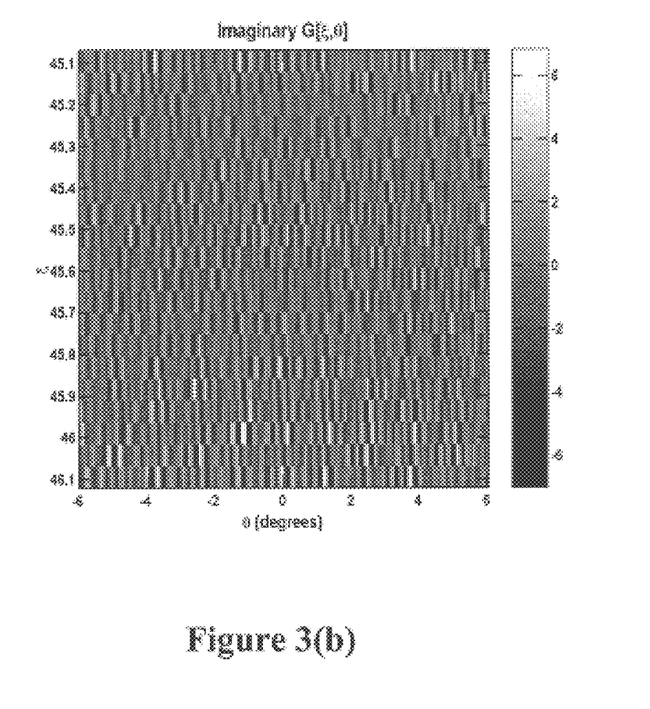

The true values of the MBRF $f(x,y,\gamma)$ shown in FIGS. 2a–2d are applied within Eq. (20) in order to simulate the measurement function $G(\xi,\theta)$ shown in FIGS. 3a and 3b. The measurement functions shown in FIGS. 3a and 3b are coherent measurements, resulting from a quadrature demodulation of the received waveform, i.e., the reflected wave form. The x-axis is the measure of angle in radians, while the y, axis is spatial frequency. The measurement functions of FIGS. 3a and 3b, when inverted using the single bounce theory, give the result shown in FIG. 4. These same measurement functions, when inverted using the process of the present invention, give the results discussed below with reference to FIGS. 5a–5d, creating not only an identical replica of the desired image but, also creating higher delay planes or multiple bounce image planes that contain the information rich echo portions of the reflected wave form. The signal-to-noise ratio in this embodiment is approximately 40 dB. As stated above, noise and interference play no greater a role in the IRAMS processing than in the single bounce processing. Consequently, one skilled in the art recognizes the standard signal-to-noise limitations that are applicable to IRAMS processing.

The results of Eq. (37)–(49) are used to determine the required sampling intervals and extents of both the spatial frequency $\xi$ and the angular coordinate $\theta$ which are necessary to reconstruct the truth MBRF $f(x,y,\gamma)$ of FIGS. 2a–2d. The desired image-space resolution is $\delta \equiv \delta_x = \delta_y = \delta_\gamma = 1$, so that Eq. (42) implies that a spatial frequency bandwidth of $\Delta_\xi = 1/\delta$ is sufficient for a well-behaved MB reconstruction. SAR measurements are collected over a narrow extent of measurement angles, which is chosen to be $\Delta_\theta \sim 0.2$ rad$\sim 11.5°$ in this particular example. Then the spatial center frequency is selected to be $\xi_{cf} = 2/\Delta 2/\theta \cong 45$, consistent with $\delta=1$ and $\Delta_\theta 0.2$ rad in Eq. (43). The desired reconstruction extents are given by $\Delta_x = \Delta_y = 16$ and $\Delta_\gamma = 4$ for this example. Thus, Eq. (45) implies that the required sampling interval in spatial frequency is $\delta_\xi = 1/20$, and Eq. (49) gives a required angular sampling interval of $\delta_\theta \cong 1/720$ rad$\cong 0.08°$.

FIGS. 5a–5d show the application of the MB inversion of Eqs. (24) and (29) in order to estimate the MBRF $f(x,y,\gamma)$ based upon the simulated phase history data $G(\xi,\theta)$ of FIGS. 3a and 3b. A shown, the $\gamma=0$, $\gamma=1$, $\gamma=2$, and $\gamma=3$ planes of FIGS. 5a–5d give an approximately identical reconstruction of the desired scattering center locations and strengths of FIG. 2a. Further, the extracted MB scattering events located within the $\gamma \neq 0$ planes can be used to augment the feature vectors applied to, for example, target recognition analysis.

Figure 4:
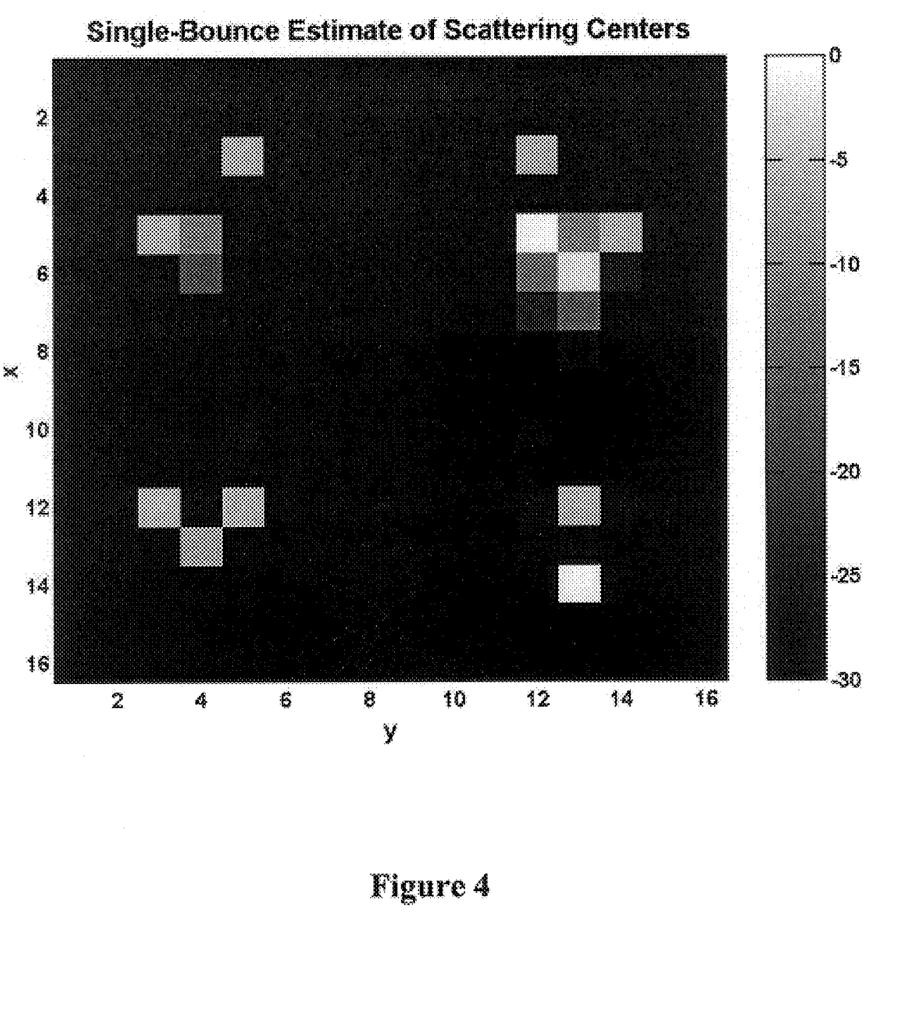
FIG. 4 illustrates scattering point data for an object-of-interest utilizing single bounce reconstruction, according to a first embodiment of the present invention.
Figure 5A:
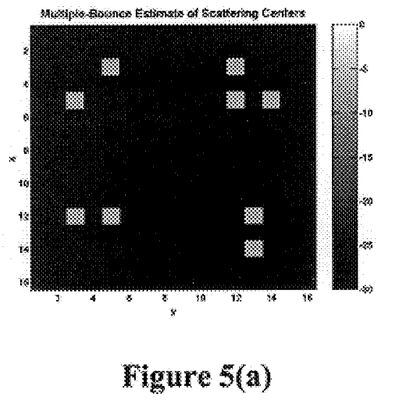
FIGS. 5(a)–5(d) illustrate scattering point data for an object-of-interest utilizing multiple bounce reconstruction according to a first embodiment of the present invention.
Figure 5B:
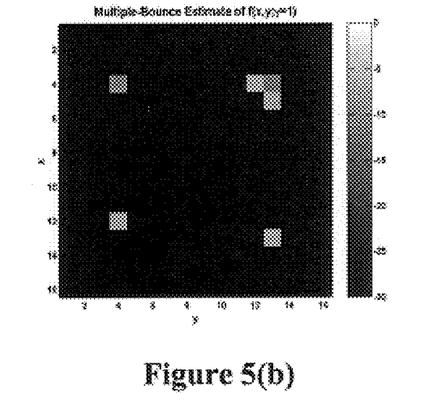
Figure 5C:
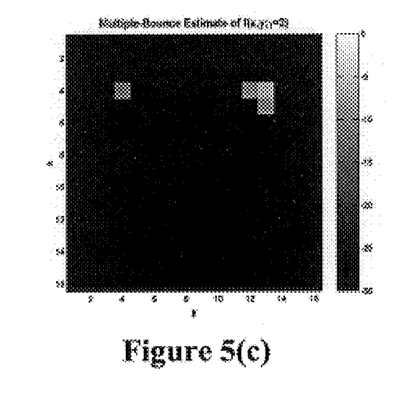
Figure 5D:
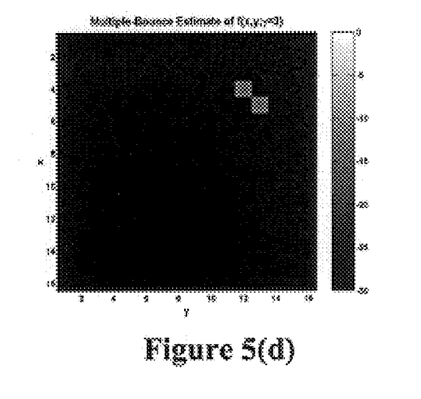
Figure 6A:
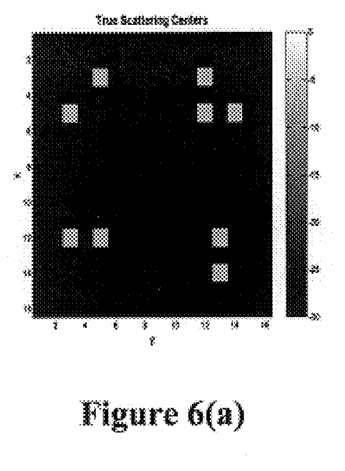
FIGS. 6(a)–6(d) illustrate true scattering point data from multiple depth planes, according to a second embodiment of the present invention.
Figure 6B:
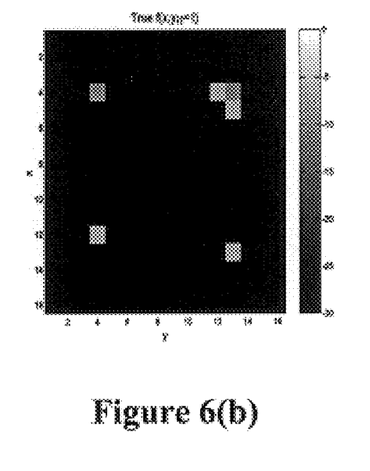
Figure 6C:
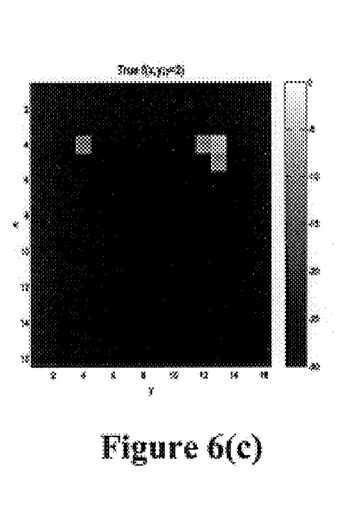
Figure 6D:
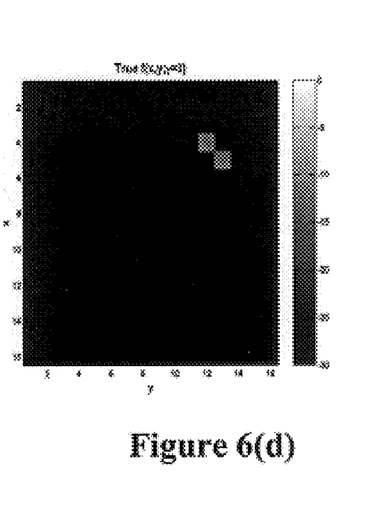

For the sake of comparison, the desirable MB image reconstruction of FIGS. 5a–5d is compared with that based upon the assumption of only SB scattering events. FIG. 4 presents the result of the SB inversion technique of Eqs. (32) and (35) applied to the simulated MB phase history data of FIGS. 3a and 3b. Clearly, the SB technique reveals a significant degradation in the estimation of the object scattering centers of FIG. 2a. Although the object locations and strengths of the various scattering centers of FIG. 2a are well-reproduced, FIG. 4 contains many additional spurious scattering centers that arise from the MB contributions to the simulated phase history data of FIGS. 3a and 3b. Whereas the MB inversion technique accurately reconstructs a given MB scattering event characterized by $(x,y,\gamma)$, the SB inversion method incorrectly projects such a point to $(x+\gamma,y)$ for phase history data measured over a narrow angular extent about $\theta=0$. For example, the MB scattering event of $(x,y,\gamma)=(12, 4, 1)$ of FIG. 2b is incorrectly projected to the point $(x,y)=(13, 4)$ within the SB estimate of FIG. 4 and similar incorrect results apply to the other MB scattering events.

The ability to form a well-behaved MB inversion depends entirely upon the coordinate grids $\{x_l, y_m, \gamma_n\}$ and $\{\xi_p, \theta_q\}$ selected for the desired MBRF $f(l,m,n)$ and the measurements $G(p,q)$. That is, the specific number of scattering centers and their MB coupling strengths within the true MBRF are irrelevant to the inversion process, so that examples containing a much higher density of scattering events can also be generated. The particular example presented herein was selected in order to demonstrate the most salient effects in the MB and SB image reconstructions.

The embodiment described above may be extended to include data from a higher number of spatial dimensions. Define r to be a vector in an N-dimensional vector space. Likewise, define k to be a unit vector in this N-D vector space. The N=2 case presented above characterizes the spatial vector via $r \equiv [x,y]^T$, with the superscript denoting vector transpose. Similarly, the unit vector for N=2 is expressed in terms of the polar coordinate angle $\theta$, i.e., $k \equiv [\cos(\theta), \sin(\theta)]^T$. Likewise, the N=3 case can be developed by defining the spatial vector $r \equiv [x,y,z]^T$ and the corresponding unit vector $k \equiv [\cos(\theta) \sin(\phi), \sin(\theta) \sin(\phi), \cos(\phi)]_T$ in terms of the spherical coordinate angles $\phi$ and $\theta$.

The generic N-D form of the MB projection equations (7) is $$g(s,k) \equiv \int dr \int d\gamma f(r,\gamma) \delta(k^T r + \gamma - s). \tag{50}$$

The corresponding N-D form of the MB transform-domain projection equation (13) becomes $$G(\xi,k) = \int dr f(r,\gamma) \exp(-j2\pi\{k^T r + \gamma\}\xi). \tag{51}$$

In a similar fashion, the N-D form of the MB back-projection equation (15) is $$b(r,\gamma) \equiv \int dk \, G(\xi,k) \exp(j2\pi\{k^T r + \gamma\}\xi). \tag{52}$$

This N-D form of the back-projection function $b(r,\gamma)$ can be expressed in the following convolutional form $$b(r,\gamma) = \lambda(r,\gamma) * f(r,\gamma), \tag{53}$$

in terms of the kernel function $$\lambda(r,\gamma) \equiv \int dk \int d\xi \exp(j2\pi\{k^T r + \gamma\}\xi) \tag{54}$$

Thus, the inversion for the MBRF yields $$f(r,\gamma) = \mathcal{F}_{N=1}^{-1} \left\{ \frac{\mathcal{F}_{N+1}\{b(r,\gamma)\}}{\mathcal{F}_{N+1}\{\lambda(r,\gamma)\}} \right\}. \tag{55}$$

A similar set of generic N-D equations can be developed in the discrete domain.

The multiple-bounce inversion technique yields excellent reconstructions of the multiple-bounce reflectivity function $f(x,y,\gamma)$. In fact, these multiple-bounce inversion methods will not degrade the reconstructed image for cases in which the phase history measurements $G(\xi,\theta)$ contain only single-bounce contributions. In contrast, the single-bounce inversion methods of conventional spotlight SAR theory yield spurious ghosting artifacts in the image reconstruction $f_{SB}(x,y)$ for cases in which multiple-bounce events contribute to the measured phase history data $G(\xi,\theta)$.

Figure 7A:
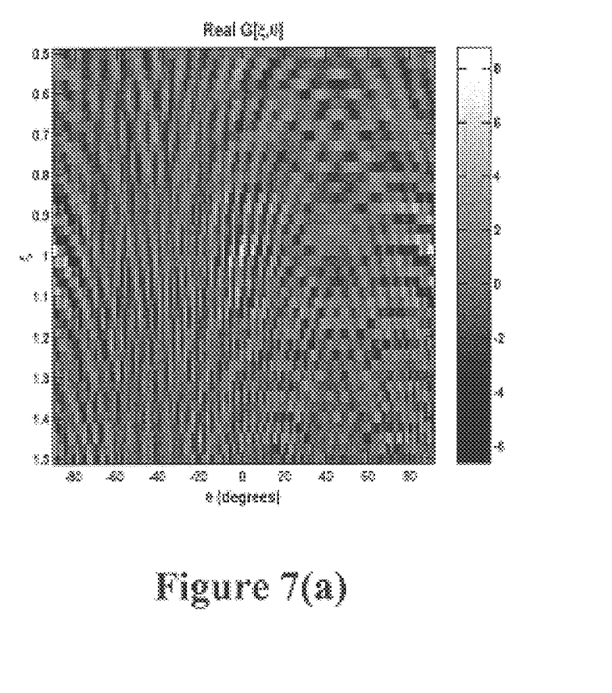
FIGS. 7(a)–7(b) illustrate measurement functions for scattering data according to a second embodiment of the present invention.
Figure 7B:
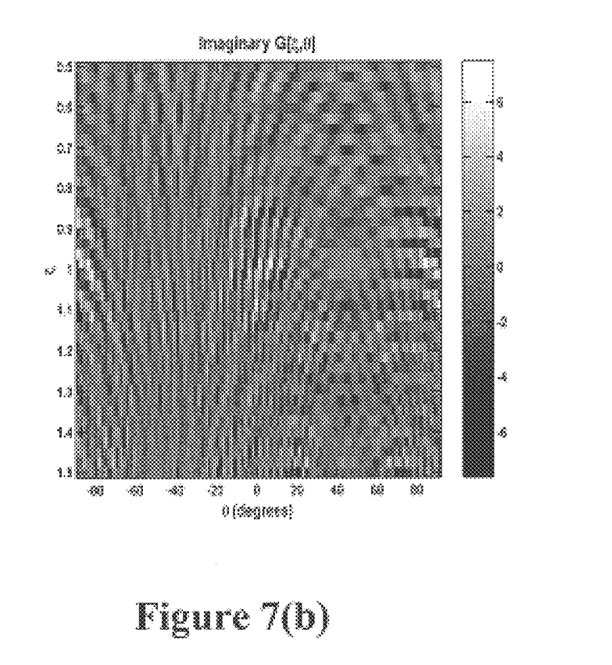
Figure 8:
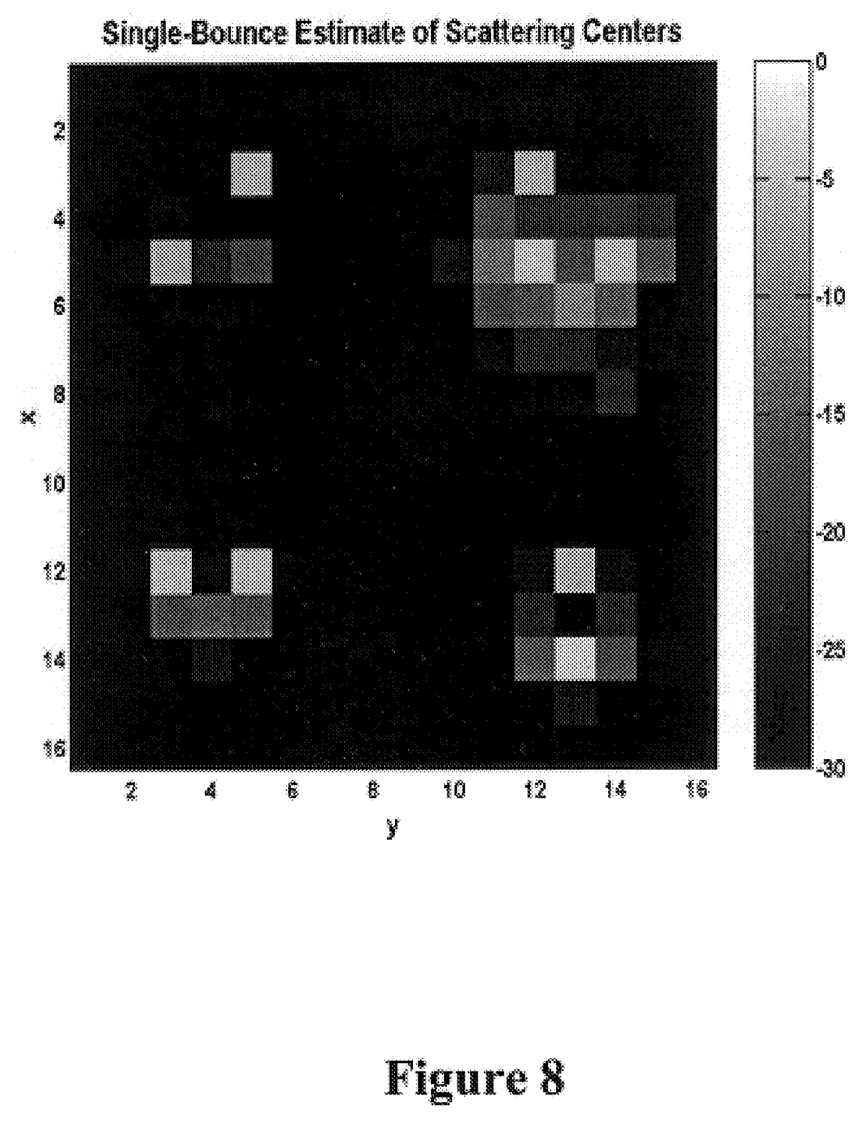
FIG. 8 illustrates scattering point data for an object-of-interest utilizing single bounce reconstruction, according to a second embodiment of the present invention.
Figure 9A:
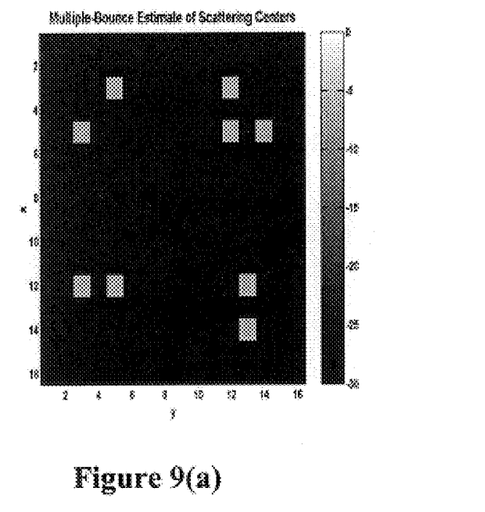
FIGS. 9(a)–9(d) illustrate scattering point data for an object-of-interest utilizing multiple bounce reconstruction according to a second embodiment of the present invention.
Figure 9B:
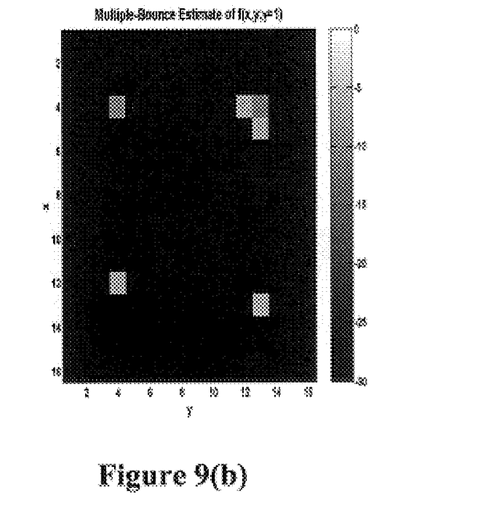
Figure 9C:
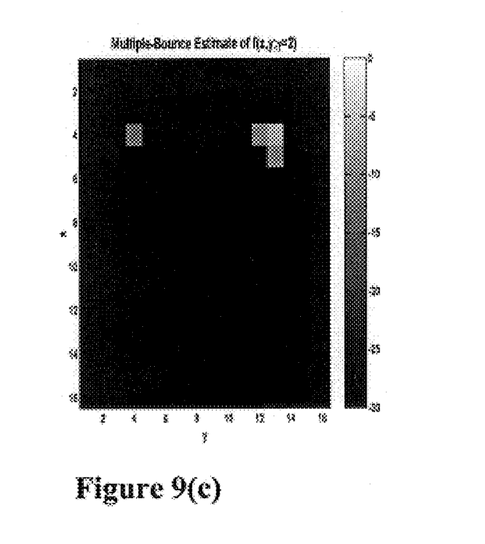
Figure 9D:
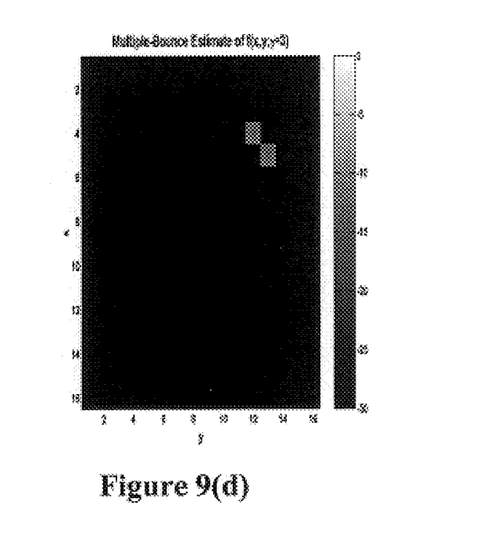

In an alternate embodiment of the present invention, FIGS. 6a–6d refer to truth reflectivity functions identical to those shown in FIGS. 3a–3d. FIGS. 7a–7b, similar to FIGS. 4a–4b, show the measurement data for $G(\xi,\theta)$ corresponding to the given $f(x,y,\gamma)$. The measurement data shown in FIGS. 7a–7b differs from that shown in FIGS. 4a–4b, in that the data is collected at low spatial frequencies from about $\xi=0.5$ to $\xi=1.5$ as opposed to the much higher spatial frequencies in FIGS. 4a–4b which is from $\xi=45.1$ to $\xi=46.1$. Inversion of the measurement data using the MB reconstruction process described herein results in a virtually identical replica depicted in FIGS. 9a–9d of the truth reflectivity function shown in FIGS. 6a–6d. Whereas, the inversion of the measurement data using the SB reconstruction process shown in FIG. 8 contains significant degradation due to the appearance of ghost scattering centers. The signal-to-noise ratio in this embodiment is approximately 40 dB. As stated above, noise and interference play no greater a role in the IRAMS processing than in the single bounce processing. Consequently, one skilled in the art recognizes the standard signal-to-noise limitations that are applicable to IRAMS processing.

The IRAMS process described herein is also applicable to near-field collection data, wherein the wavefronts are curved. For the 2-D problem above, assume that the radius and angle (in polar coordinates) of the sensor are given by $R(\eta)$ and $\phi(\eta)$, respectively, in terms of a scalar parameter $\eta$ which can vary in any fashion with regard to the attributes of the scene of interest. Then the measured range-to-target with respect to the coordinate origin is $$s(R(\eta), \phi(\eta)) = \frac{1}{2}\sqrt{[R(\eta)\cos(\phi(\eta)) - x_i]^2 + [R(\eta)\sin(\phi(\eta)) - y_i]^2} + \frac{1}{2}\sqrt{[R(\eta)\cos(\phi(\eta)) - x_f]^2 + [R(\eta)\sin(\phi(\eta)) - y_f]^2} + \gamma - R(\eta) \quad (56)$$

This equation replaces Eq. (1) for the near-field problem. The remainder of the analysis is straightforward, wherein the integrations/summations over $\theta$ are replaced by the corresponding integrations/summations over the scalar parameter $\eta$. It can also be verified by a Taylor series expansion that the near-field equation (56) reduces to the far-field equation (1) as the radius $R(\eta)$ becomes much larger than the size of the scene of interest. Equation (56) can be further extended to apply for a non-planar collection surface by defining the sensor location in terms of the spherical coordinates $(R(\eta), \phi(\eta),\omega)(\eta))$ parameterized by the scalar parameter $\eta$ via $$s(R(\eta), \phi(\eta), \omega(\eta)) = \frac{1}{2}\sqrt{\begin{array}{l}[R(\eta)\cos(\phi(\eta))\sin(\omega(\eta)) - x_i]^2 + \\ [R(\eta)\sin(\phi(\eta))\sin(\omega(\eta)) - y_i]^2 + \\ [R(\eta)\cos(\omega(\eta)) - z_i]^2\end{array}} + \frac{1}{2}\sqrt{\begin{array}{l}[R(\eta)\cos(\phi(\eta))\sin(\omega(\eta)) - x_f]^2 + \\ [R(\eta)\sin(\phi(\eta))\sin(\omega(\eta)) - y_f]^2 + \\ [R(\eta)\cos(\omega(\eta)) - z_f]^2\end{array}} + \gamma - R(\eta) \quad (57)$$

This type of modeling also permits targets to have different heights z.

Further, the location of the transmitter and receiver can be different. The required modifications for such a bistatic collection are well-known to those skilled in the art. There are two primary modifications required. First, the measurement angle $\theta$ for a two-dimensional monostatic collection (wherein the transmitter and receiver are co-located) in the far-field is replaced by the bisector angle between the angle of the transmitter and that of the receiver. Second, the measured spatial frequencies for this problem are scaled by the factor $\cos(\beta/2)$, with $\beta$ equal to the angle between that of the transmitter and that of the receiver. Further extension of the bistatic problem to the near-field case and to a non-planar collection surface, as presented above for the monostatic case, can be accomplished by one who is skilled in the art.

The specific examples described above are not intended to be limiting. Alteration of the processes described above is contemplated by one skilled in the art for application of the IRAMS process to various types of reflection tomographic data, including radar, sonar, and the like.

What is claimed is:

1. A process for reconstructing a scene from scattering data comprising:
   collecting scattering data from a scene, wherein the scattering data represents
   (a) at least two scattering points and
   (b) at least one multiple bounce ghost,
   wherein (a) and (b) are located in any one of image planes, 0 to P, wherein P is greater than 0;
   separating (a) and (b) from the scattering data according to their respective locations within image planes 0 to P; and
   reconstructing the scene according to the image plane containing only (a).

2. The process according to claim 1, wherein the scattering data is collected for two-dimensions of the scene.

3. The process according to claim 1, wherein the scattering data is collected using synthetic aperture radar.

4. The process according to claim 3, wherein the scattering data is collected over an aspect angle extent of less than fifteen degrees.

5. The process according to claim 3, wherein the scattering data is collected over an aspect angle extent of more than fifteen degrees.

6. The process according to claim 1, wherein the scene is reconstructed in three dimensions.

7. The process according to claim 1, wherein the scattering data is collected using a co-located transmitter and receiver.

8. The process according to claim 7, wherein the scattering data is comprised of waveforms when it is collected by the co-located transmitter and receiver.

9. The process according to claim 8, wherein the waveforms are collected at a far-field location, such that the wavefronts impinging on the region to be imaged and collected at the receiver are approximately linear.

10. The process according to claim 8, wherein the waveforms are collected at a near-field location, such that the wavefronts impinging on the region to be imaged and collected at the receiver are curved.

11. The process according to claim 1, wherein the scattering data is collected using non co-located transmitters and receivers.

12. A method for imaging an object-of-interest comprising:
   collecting scattering data from the object-of-interest;
   processing the scattering data to account for multiple bounces from the object-of-interest; and
   imaging the object-of-interest using the processed scattering data.

* * * * *